US011951841B2

(12) United States Patent
Son

(10) Patent No.: US 11,951,841 B2
(45) Date of Patent: Apr. 9, 2024

(54) ECO-FRIENDLY VEHICLE AND POWER MANAGEMENT METHOD THEREFOR

(71) Applicants: Hyundai Motor Company, Seoul (KR); Kia Corporation, Seoul (KR)

(72) Inventor: Hui Un Son, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 121 days.

(21) Appl. No.: 17/872,256

(22) Filed: Jul. 25, 2022

(65) Prior Publication Data

US 2023/0036619 A1 Feb. 2, 2023

(30) Foreign Application Priority Data

Jul. 30, 2021 (KR) ........................ 10-2021-0100594

(51) Int. Cl.
| | |
|---|---|
| *B60L 15/20* | (2006.01) |
| *B60R 25/31* | (2013.01) |
| *B60R 25/40* | (2013.01) |
| *H02J 7/00* | (2006.01) |
| *H02J 7/34* | (2006.01) |

(52) U.S. Cl.
CPC .......... *B60L 15/2045* (2013.01); *B60R 25/31* (2013.01); *B60R 25/403* (2013.01); *H02J 7/0048* (2020.01); *H02J 7/342* (2020.01)

(58) Field of Classification Search
CPC ..... B60L 15/2045; H02J 7/0048; H02J 7/342; B60R 25/31; B60R 25/403
See application file for complete search history.

(56) References Cited

U.S. PATENT DOCUMENTS

| | | | |
|---|---|---|---|
| 10,850,707 B1* | 12/2020 | Farmer | .................. B60R 25/01 |
| 2021/0170898 A1* | 6/2021 | Ando | ...................... B60L 53/16 |
| 2021/0237687 A1* | 8/2021 | Tsuchiya | ................ H04W 4/48 |

FOREIGN PATENT DOCUMENTS

KR 10-2016-0013659 A 2/2016

* cited by examiner

*Primary Examiner* — Jared Fureman
*Assistant Examiner* — Duc M Pham
(74) *Attorney, Agent, or Firm* — Fox Rothschild LLP

(57) ABSTRACT

Disclosed is an eco-friendly vehicle capable of conveniently canceling a protection mode when the protection mode is entered due to a voltage drop of a low-voltage battery, and a power management method therefor. A power management method for an electrified vehicle may comprise controlling, by a power management controller, an out-vehicle switch from a first mode for changing a locked state to a second mode for battery reset when there is a request for entry into a protection mode for a low-voltage battery from a BMS, and entering the protection mode when the out-vehicle switch is changed to the second mode.

20 Claims, 6 Drawing Sheets

[FIG. 1A]
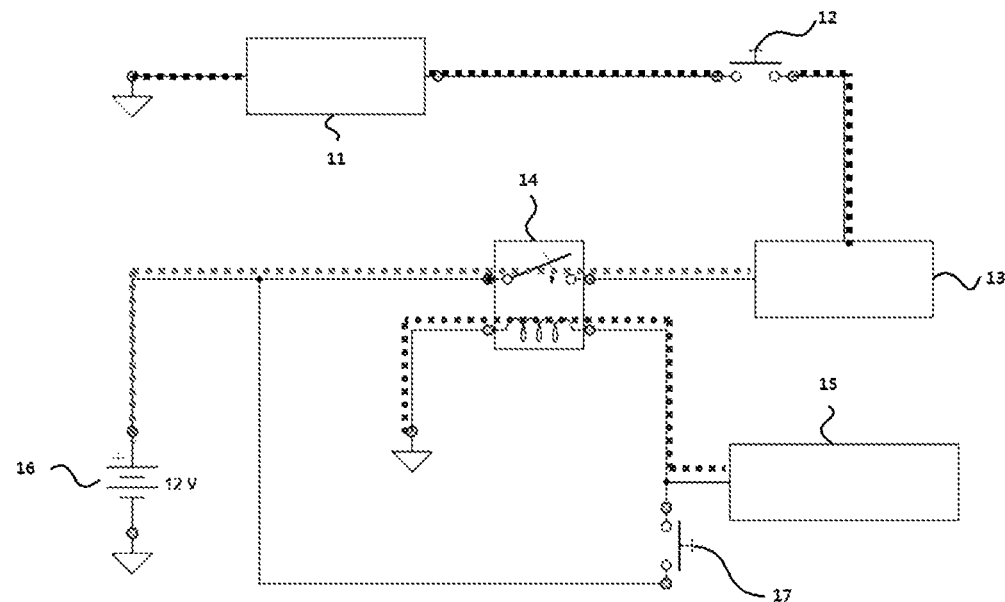
[FIG. 1B]
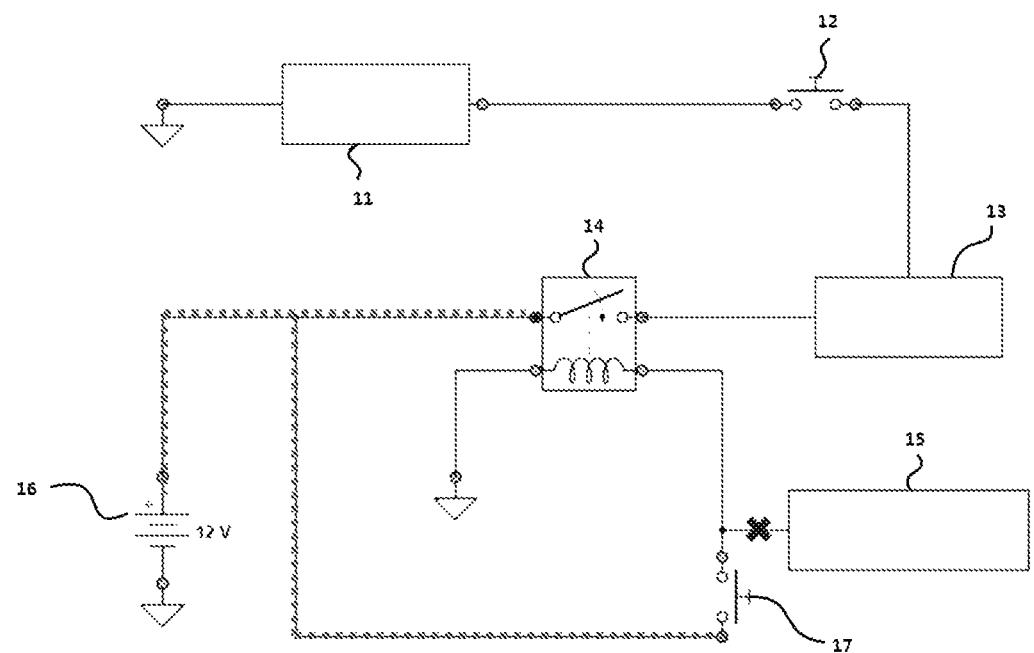

[FIG. 1C]
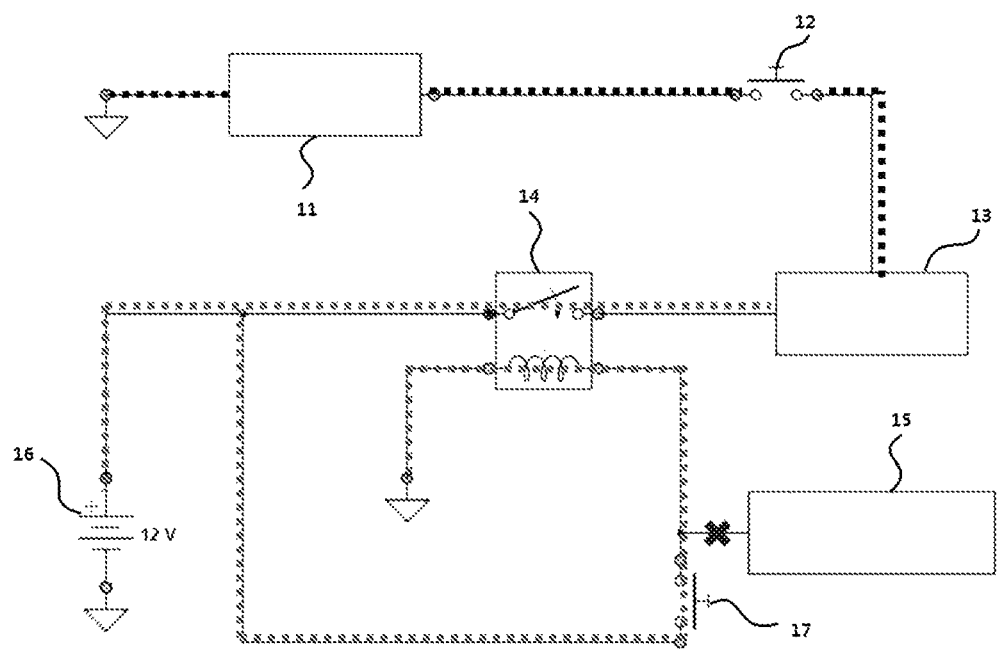
[FIG. 2]
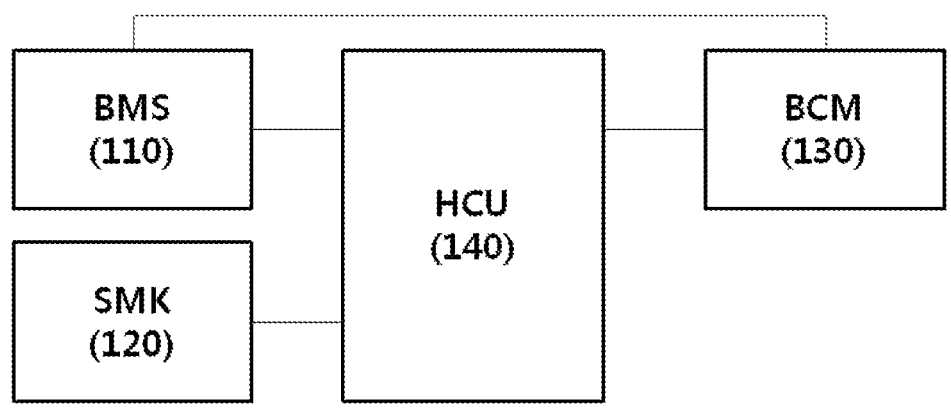

[FIG. 3]
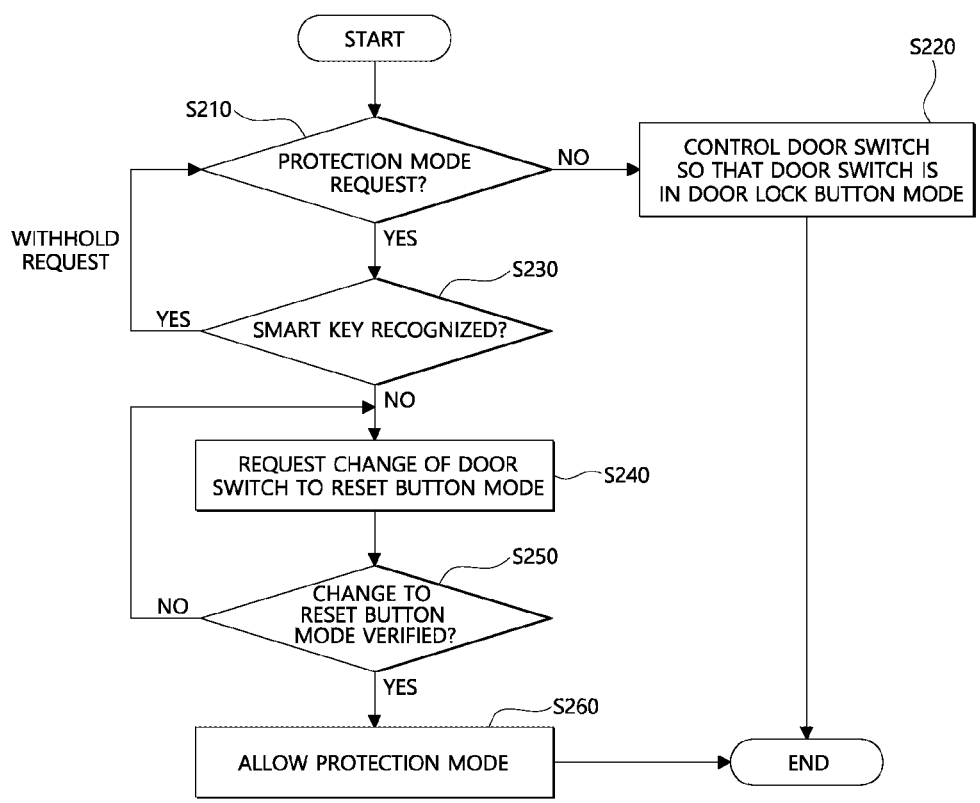

[FIG. 4A]
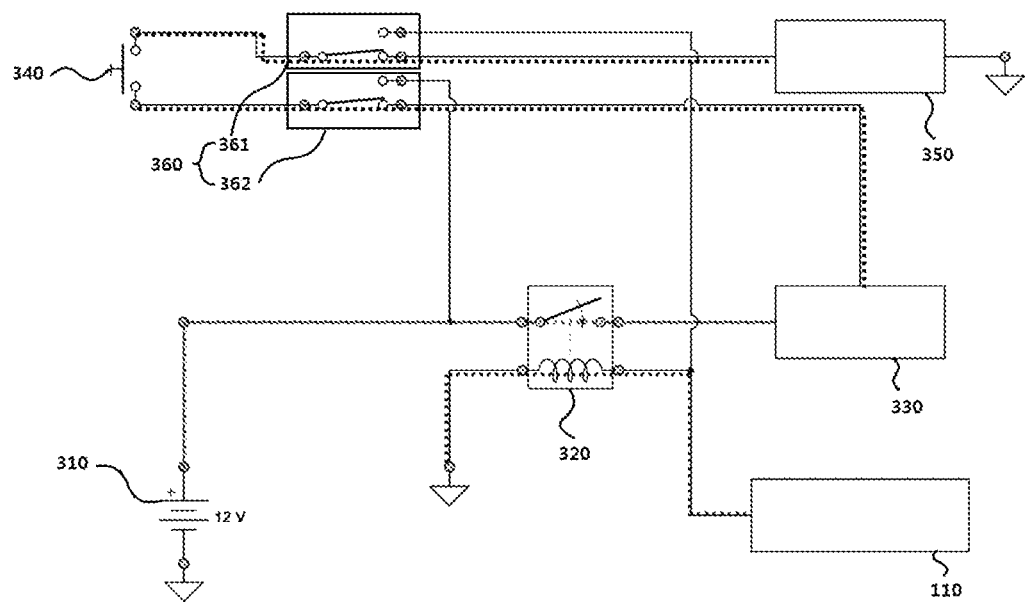
[FIG. 4B]
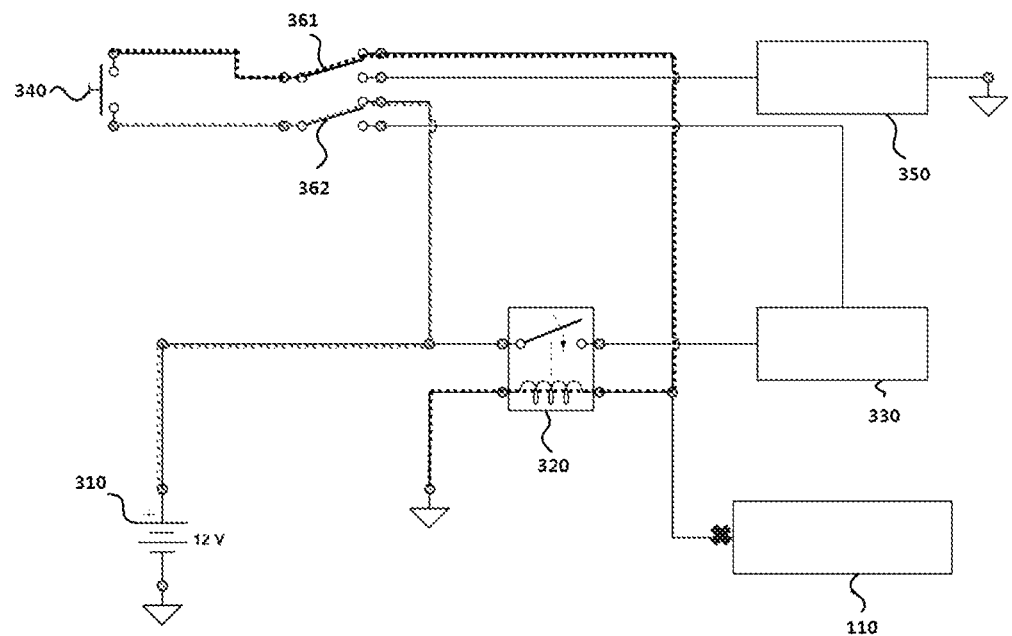

【FIG. 5A】
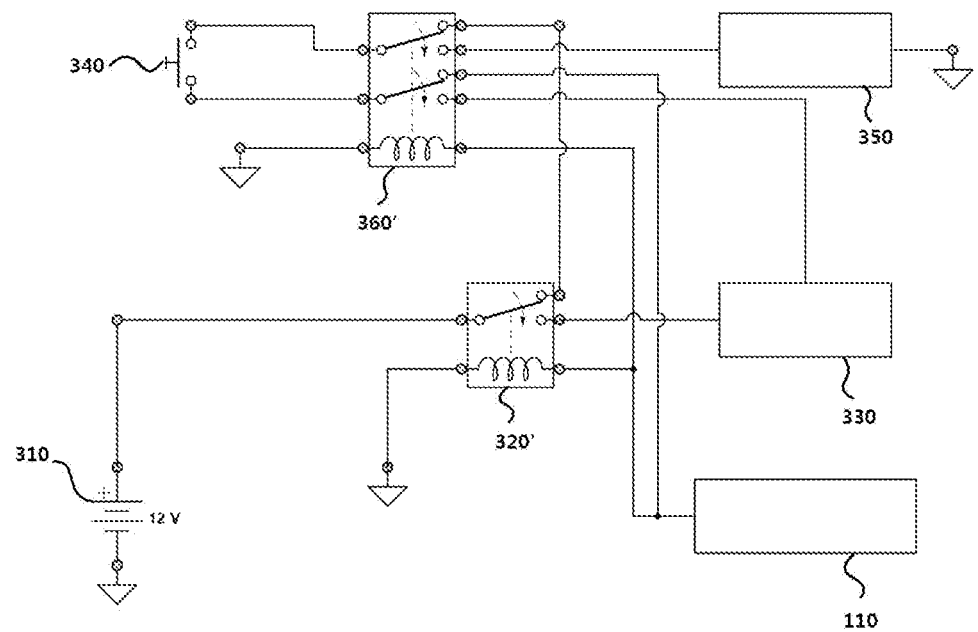
【FIG. 5B】
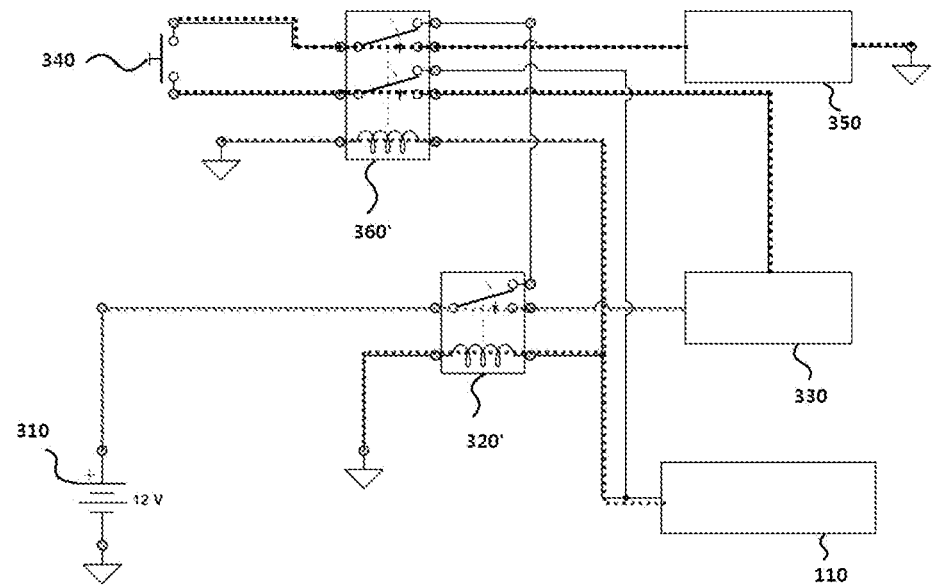

[FIG. 5C]
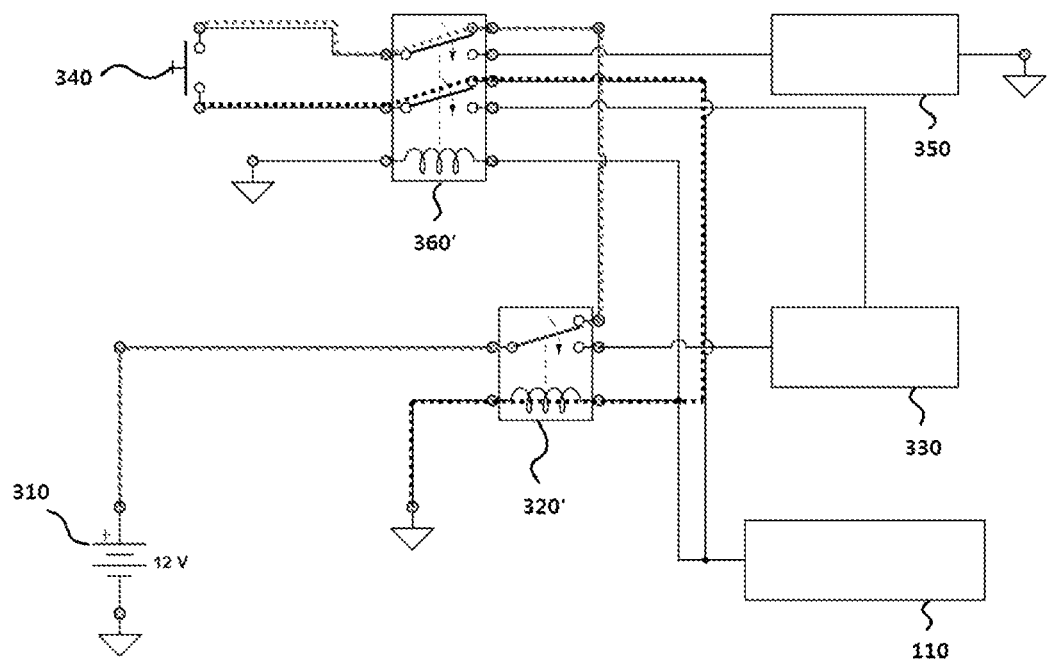

ECO-FRIENDLY VEHICLE AND POWER MANAGEMENT METHOD THEREFOR

CROSS-REFERENCE TO RELATED APPLICATION(S)

This application claims, under 35 U.S.C. § 119(a), the benefit of Korean Patent Application No. 10-2021-0100594, filed on Jul. 30, 2021, the disclosure of which is incorporated herein by reference in its entirety.

BACKGROUND

Technical Field

Embodiments of the present disclosure relate to an eco-friendly vehicle capable of conveniently canceling a protection mode when the protection mode is entered due to a voltage drop of a low-voltage battery, and a power management method therefor.

Description of the Related Art

With the recent increase in interest in the environment, the number of electrified vehicles, each having an electric motor as a power source, has been increasing. Representative examples of electrified vehicles include an electric vehicle (EV) and a hybrid electric vehicle (HEV). Such an electrified vehicle includes a high-capacity and high-voltage battery for driving an electric motor and a low-voltage, for example, 12V, battery for driving electric equipment.

While a typical vehicle has a replaceable I2V lead-acid battery, the 12V battery of an electrified vehicle is generally a lithium polymer battery and is generally implemented in a form integrated into the high-voltage battery. In an electrified vehicle, a battery protection system is provided, and when the voltage of the 12V battery falls below a certain voltage, a protection mode that blocks the 12V battery to prevent further discharge is activated.

A process of activating and canceling the protection mode will be described with reference to FIGS. 1A to 1C.

FIG. 1A illustrates a normal operation state of a general electrified vehicle, FIG. 1B illustrates a state in which the protection mode is activated, and FIG. 1C illustrates a state in which the protection mode is canceled.

First, referring to FIG. 1A, elements of an electric vehicle related to releasing a door lock may comprise a door lock 11, a door switch 12, a junction box 13, a battery relay 14, a battery management system (BMS) 15, a 12V battery 16, a battery reset switch, etc. The door switch 12 is generally disposed on a door handle.

First, referring to FIG. 1A, the BMS 15 monitors the voltage of the 12V battery 16 and, when the voltage of the 12V battery 16 is greater than or equal to a certain value, the BMS 15 controls the battery relay 14 so that the battery relay 14 is in a closed state, thereby supplying power to the junction box 13. Accordingly, when a driver operates the door switch 12, power is supplied to the door lock 11 through the junction box 13, so that a locked state of the door lock 11 can be canceled. It is usually necessary to verify, whether a smart key is present around the vehicle before the door lock 11 is released.

However, when the BMS 15 detects that the voltage of the 12V battery 16 is less than the certain value, the protection mode is activated. That is, as illustrated in FIG. 1B, the BMS 15 controls the battery relay 14 so that the battery relay 14 is in an open state, thereby blocking power of the 12V battery 16 from being supplied to the junction box 13. Therefore, when the protection mode is activated, even when the door switch 12 is operated, the door is not opened since power is not supplied to the door lock 11.

When the reset switch 17 is operated in the state, illustrated in FIG. 1B, the battery relay 14 is controlled so that the battery relay 14 is in the closed state, as illustrated in FIG. 1C, thereby canceling the protection mode, power of the battery 16 is again transmitted to the junction box 13, and the door lock 11 becomes operable according to the operation of the door switch 12. Thereafter, the BMS 15 again controls the battery relay 14 so that the battery relay 14 is in the closed state, and the BMS 15 may charge the 12V battery 16 using power of a high-voltage battery (not illustrated).

As described above with reference to FIGS. 1A to 1C, when the protection mode is activated, power of the 12V battery cannot be transmitted to the electric equipment in the vehicle, and thus the vehicle door lock cannot be released using the smart key. In general, a 12V battery reset switch for cancelling the protection mode is located indoors. Therefore, to drive the vehicle, the driver needs to insert a key into a keyhole, which is exposed when a cover around the door handle is removed, to release the door lock, and then board the vehicle to operate the 12V battery reset switch.

This scheme causes inconvenience to the driver. Moreover, there are many drivers who do not know how to release the door lock by inserting the key in a situation where the smart key does not work. Further, in a process of removing the cover, damage to the exterior of the vehicle may occur, which is a problem. In addition, drivers accustomed to conventional internal combustion engine vehicles may mistake the protection mode for battery discharge and complain about the quality.

SUMMARY

Accordingly, the present disclosure is directed to an eco-friendly vehicle and a power management method therefor that substantially obviate one or more problems due to limitations and disadvantages of the related art.

An object of the present disclosure is to provide an eco-friendly vehicle capable of conveniently canceling a protection mode when the protection mode is entered, and a power management method therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a power management method for an electrified vehicle comprises controlling, by a power management controller, an out-vehicle switch so that the out-vehicle switch is changed from a first mode for changing a locked state to a second mode for battery reset when there is a request for entry into a protection mode for a low-voltage battery from a battery management system (BMS), and entering the protection mode when the out-vehicle switch is changed to the second mode.

The method may further comprise determining whether a smart key is detected, in which the controlling may be performed when the smart key is not detected.

The method may further comprise withholding the request for entry when the smart key is detected.

The controlling may comprise requesting, by the power management controller, a change to the second model from a body control module (BCM), and controlling, by the BCM, a mode change switch unit having a first state corresponding to the first mode and a second state corresponding to the second mode so that the mode change switch unit is in the second state.

The mode change switch unit may comprise a first switch and a second switch, one end of the first switch may be continuously connected to the out-vehicle switch, and another end of the first switch may be connected to an actuator for changing the locked state in the first state and may be connected to a battery relay for changing an electrical connection state between a junction box and the low-voltage battery in the second state, and one end of the second switch may be continuously connected to the out-vehicle switch, and another end of the second switch may be connected to the junction box in the first state and may be connected to the low-voltage battery in the second state.

When the request for entry into the protection mode is not output, the BMS may deliver a relay on signal to the battery relay, and when the out-vehicle switch is operated while the relay on signal is delivered, a voltage of the low-voltage battery may be applied to the actuator via the junction box.

The method may further comprise cancelling the protection mode when the out-vehicle switch is operated after entry into the protection mode, and changing the out-vehicle switch from the second mode to the first mode.

The mode change switch unit may comprise a switch relay linked with a battery relay.

The power management controller may comprise a hybrid control unit (HCU) or a vehicle control unit (VCU).

The out-vehicle switch may be a door handle, a door lock button disposed on the door handle, a trunk button, or a tailgate button.

In another aspect of the present disclosure, an electrified vehicle comprises a low-voltage battery, a BMS configured to monitor a state of the low-voltage battery, and a power management controller configured to control an out-vehicle switch so that the out-vehicle switch is changed from a first mode for changing a locked state to a second mode for battery reset when there is a request for entry into a protection mode for the low-voltage battery from the BMS, and allow the BMS to enter the protection mode.

The electrified vehicle may further comprise a smart key controller (SMK) configured to detect a smart key, in which, when the smart key is not detected by the SMK, the power management controller may perform a control operation to change the out-vehicle switch to the second mode.

When the smart key is detected by the SMK, the power management controller may withhold the request for entry.

The electrified vehicle may further comprise a mode change switch unit having a first state corresponding to the first mode and a second state corresponding to the second mode, and a BCM configured to control the mode change switch unit so that the mode change switch unit is in the first state or the second state, in which the power management controller may request a change to the second mode from the BCM.

The mode change switch unit may comprise a first switch and a second switch, one end of the first switch may be continuously connected to the out-vehicle switch, and another end of the first switch may be connected to an actuator for changing the locked state in the first state and may be connected to a battery relay for changing an electrical connection state between a junction box and the low-voltage battery in the second state, and one end of the second switch may be continuously connected to the out-vehicle switch, and another end of the second switch may be connected to the junction box in the first state and may be connected to the low-voltage battery in the second state.

When the request for entry into the protection mode is not output, the BMS may deliver a relay on signal to the battery relay, and when the out-vehicle switch is operated while the relay on signal is delivered, a voltage of the low-voltage battery may be applied to the actuator via the junction box.

When the out-vehicle switch is operated after entry into the protection mode, the power management controller may request a change to the first mode from the BCM.

The mode change switch unit may comprise a switch relay linked with a battery relay.

The power management controller may comprise an HCU or a VCU.

The out-vehicle switch may be a door handle, a door lock button disposed on the door handle, a trunk button, or a tailgate button.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1A illustrates a normal operation state of a general electrified vehicle, FIG. 1B illustrates a state in which a protection mode is activated, and FIG. 1C illustrates a state in which the protection mode is canceled;

FIG. 2 illustrates an example of a configuration of a control system of an electrified vehicle according to an exemplary embodiment of the present disclosure;

FIG. 3 illustrates an example of a process in which power management is performed in a power management controller according to an exemplary embodiment of the present disclosure;

FIG. 4A illustrates an example of a power state in a normal operation state of the electrified vehicle according to an exemplary embodiment of the present disclosure;

FIG. 4B illustrates an example of a power state in a protection mode of the electrified vehicle according to an exemplary embodiment of the present disclosure;

FIG. 5A illustrates an example of a system configuration of a low-voltage system of an electrified vehicle according to another embodiment of the present disclosure;

FIG. 5B illustrates an example of a power state in a normal operation state of the electrified vehicle according to the other embodiment of the present disclosure; and FIG. 5C illustrates an example of a power state in a protection mode of the electrified vehicle according to the other embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, embodiments disclosed in this specification will be described in detail with reference to the accompanying drawings, and the same or similar elements will be given the same reference symbols regardless of drawing numbers, and redundant description thereof will be omitted. In addition, a detailed description of well-known features or functions will be ruled out in order not to unnecessarily obscure the gist of the present disclosure.

In the following description, the terms "module" and "unit" for referring to elements are assigned and used interchangeably in consideration of convenience of explanation, and thus, the terms per se do not necessarily have different meanings or functions. Further, in describing the embodiments disclosed in the present specification, when it is determined that a detailed description of a related publicly known technology may obscure the gist of the embodiments disclosed in the present specification, the detailed description thereof will be omitted. In addition, the accompanying drawings are used to help easily understand the embodiments disclosed in this specification, the technical idea disclosed in this specification is not limited by the accompanying drawings, and it should be understood that all alterations, equivalents, and substitutes included in the spirit and scope of the present disclosure are included herein.

Although terms including ordinal numbers, that is, "first", "second", etc. may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Embodiments of the present disclosure propose that, when a protection mode is entered due to a voltage drop of a low-voltage battery such as a 12V battery in an eco-friendly vehicle, a function of a switch operated outside the vehicle before boarding the vehicle is switched to a battery reset switch, so that the protection mode may be canceled in a natural vehicle boarding process of a driver.

For example, the switch operated outside the vehicle before boarding the vehicle may be a push-type door lock button disposed on a door handle, a button operated when pulling or turning a handle in the case of a no-button type door handle, a trunk button, a tailgate button, etc. However, when the switch is a type in which a contact connection state varies according to physical manipulation, a shape or an arrangement position thereof is not limited.

However, for convenience of description, in the following description, it is assumed that the switch operated outside the vehicle before boarding the vehicle is a door lock button (hereinafter referred to as "door switch") disposed on the door handle, and an electrified vehicle is an HEV.

FIG. 2 illustrates an example of a configuration of a control system of an electrified vehicle according to an exemplary embodiment of the present disclosure.

Referring to FIG. 2, in order to perform power management according to an exemplary embodiment, the electrified vehicle may comprise a BMS 110, an SMK 120, a BCM 130, and an HCU 140.

The BMS 110 may be configured to monitor states of a high-voltage battery and a low-voltage (that is, 12V) battery integrated therein, notify the HCU 140 that it is necessary to enter a protection mode when it is necessary to enter the protection mode, and perform a control operation in response to entry into the protection mode under approval of the HCU 140. In addition, when the protection mode is canceled, the BMS 110 may be configured to charge the 12V battery with power of the high-voltage battery.

The SMK 120 may be configured to detect whether a smart key is present inside or around the vehicle, and may be configured to notify the HCU 140 of a detection result.

The BCM 130 may be configured to integrate and manage electric equipment of the vehicle using a low-voltage system, for example, various types of electric equipment connected through a Body-CAN (B-CAN) network, and may be configured to change an operation mode of the door switch in relation to the present embodiment.

The HCU 140 is a higher-level controller in charge of overall control of a power train of the HEV, and is illustrated in FIG. 2 as an example of a power management controller that performs control for power management according to an exemplary embodiment. Thus, the present disclosure is not limited thereto. That is, in actual implementation, the HCU 140 may be configured to be replaced with another controller, may be configured to be implemented by distributing a function to two or more controllers, or may be configured to be implemented as a separate controller for this function. For example, when the electrified vehicle is an EV, the HCU 140 may be configured to be replaced with a VCU.

An operation of the HCU 140 related to the present embodiment will be described with reference to FIG. 3.

FIG. 3 illustrates an example of a process in which power management is performed in the power management controller according to an exemplary embodiment of the present disclosure.

Referring to FIG. 3, the HCU 140 controls the door switch so that the door switch is in a door lock button mode for locking/unlocking the door (S220) until a protection mode request is delivered from the BMS 110 (No in S210). For example, in a situation in which the protection mode of the 12V battery is not entered, the HCU 140 may not perform a separate operation in relation to power management. When the protection mode is entered, the door switch may be in a reset button mode to be described later, and thus it is possible to instruct the BCM 130 to change the door switch to the door lock button mode.

On the other hand, when the protection mode request is delivered from the BMS 110 (Yes in S210), the HCU 140 verifies whether the smart key is recognized from the SMK 120 (S230). When the smart key is recognized (Yes in S230), this fact means that the driver is in or around the vehicle, and thus the protection mode request may be continuously withheld. On the other hand, when the smart key is not recognized (No in S230), the HCU 140 requests that the BCM 130 change the door switch to the reset button mode (S240).

Here, changing to the reset button mode means that, through a predetermined type of switch control, the BCM 130 operates as a battery reset button capable of canceling the protection mode by controlling a battery relay during operation rather than in the door lock button mode, which is the original purpose of the door switch.

The HCU 140 may be configured to verify whether the change of the door switch to the reset button mode is completed from the BCM 130 (S250), and allow the BMS 110 to change to the protection mode (S260) when the change is completed (Yes of S250).

As described above, when the door switch is operated after switching to the reset button mode, voltage may be applied to the battery relay to cancel the protection mode of the 12V battery, and in response to the protection mode being canceled (No in S210), the door switch may be changed back to the door lock button mode (S220). Therefore, when the driver re-operates the door switch, the door lock may be configured to be immediately released after checking the smart key, and the BMS 110 may be configured to check a state of charge (SOC) of the 12V battery and perform charging using power of the high-voltage battery up to a preset SOC.

A configuration of the low-voltage system for performing the above-described power management procedure will be described with reference to FIGS. 4A and 4B.

FIG. 4A illustrates an example of a power state in a normal operation state of the electrified vehicle according to an exemplary embodiment of the present disclosure, and FIG. 4B illustrates an example of a power state in the protection mode of the electrified vehicle according to an exemplary embodiment of the present disclosure.

In FIGS. 4A and 4B, a power delivery path of the 12V battery is mainly illustrated, and thus it should be noted that illustration of the remaining controllers except for the BMS 110 among the elements of FIG. 2 is omitted.

First, referring to FIG. 4A, the low-voltage system of the electrified vehicle according to an exemplary embodiment may comprise a BMS 110, a 12V battery 310, a battery relay 320, a junction box 330, a door switch 340, a door lock 350, and a mode change switch unit 360.

The door lock 350 may comprise an actuator for changing the locked state of the door on which the door switch 340 is disposed, and the mode change switch unit 360 may comprise a first switch 361 and a second switch 362. An electrically controllable switching element may be used so that a state of each of the switches 361 and 362 of the mode change switch unit 360 can be changed under control of the BCM 130. However, the present disclosure is not limited thereto.

One end of the first switch 361 is continuously connected to the door switch 340, and another end thereof is connected to the door lock 350 in a first state for the door lock button mode and is connected to the battery relay 320 in a second state for the reset button mode.

One end of the second switch 362 is continuously connected to the door switch 340, and another end thereof is connected to the junction box 330 in the first state for the door lock button mode and is connected to the 12V battery 310 in the second state for the reset button mode.

Therefore, in the case where the door switch 340 is in the door lock button mode, that is, the mode change switch unit 360 is in the first state, when the door switch 340 is operated, the voltage of the junction box 330 can be applied to the door lock 350.

In addition, in the case where the door switch 340 is in the reset button mode, that is, the mode change switch unit 360 is in the second state, when the door switch 340 is operated, the voltage of the battery 310 can be applied to the battery relay 320 to cancel the protection mode.

A steady state operation will be described based on the above configuration as follows.

The BMS 110 monitors the voltage of the 12V battery 310, and when the voltage of the 12V battery 310 is greater than or equal to a certain value, the BMS 110 controls the battery relay 320 so that the battery relay 320 is in a closed state, thereby supplying power to the junction box 330. In this situation, since there is no protection mode request from the BMS 110, the HCU 140 causes the door switch 340 to operate in the door lock button mode, and the BCM 130 controls the mode change switch unit 360 so that the mode change switch unit 360 is in the first state to this end.

Accordingly, when the driver operates the door switch 340, power is supplied to the door lock 350 through the junction box 330, and thus the locked state of the door lock 350 may be changed.

Incidentally, upon detecting that the voltage of the 12V battery 310 is less than the certain value, the BMS 110 delivers a protection mode request to the HCU 140. As described above with reference to FIG. 3, when the smart key is not detected, the HCU 140 requests that the BCM 130 change the mode of the door switch 340. Accordingly, the BCM 130 controls the mode change switch unit 360 so that the mode change switch unit 360 is in the second state as illustrated in FIG. 4B. The HCU 140 may be configured to verify whether the mode of the door switch 340 is changed from the BCM 130 and allow the BMS 110 to enter the protection mode. Accordingly, the BMS 110 may be configured to deliver an off signal to the battery relay 320. Thereafter, when the driver operates the door switch 340, since the mode change switch unit 360 is in the second state, the voltage of the battery 310 is applied to the battery relay 320, so that the protection mode is canceled, and the HCU 140 may be configured to request that the BCM 130 change the mode of the door switch 340. Accordingly, the BCM 130 may be configured to change the mode change switch unit 360 to the first state again as illustrated in FIG. 4A.

In the embodiments described so far, the mode change switch unit 360 comprises two switches. However, according to another embodiment of the present disclosure, the mode change switch unit may be configured to be replaced with a relay that operates in conjunction with a battery relay, which will be described with reference to FIGS. 5A to 5B.

FIG. 5A illustrates an example of a system configuration of a low-voltage system of an electrified vehicle according to another embodiment of the present disclosure.

Referring to FIG. 5A, overlapping description will be omitted since remaining elements are similar to those of FIGS. 4A and 4B, except that the mode change switch unit 360' is changed to a switch relay instead of the switches 361 and 362, the battery relay 320' is changed to have a first state of being connected to the junction box 330 and a second state of being connected to the mode change switch unit 360' rather than simple open/closed states, and the BMS 110 transmits a relay control signal not only to the battery relay 320' but also to the mode change switch unit 360'.

FIG. 5B illustrates an example of a power state in a normal operation state of the electrified vehicle according to the other embodiment of the present disclosure.

Referring to FIG. 5B, when the battery 310 is in a normal voltage state, the BMS 110 controls the battery relay 320' and the mode change switch unit 360' using a relay on signal. Accordingly, the battery relay 320' allows power of the battery 310 to be transferred to the junction box 330, and the mode change switch unit 360' allows electrical connection between the junction box 330 and the door lock 350 when the door switch 340 is operated.

FIG. 5C illustrates an example of a power state in a protection mode of the electrified vehicle according to the other embodiment of the present disclosure.

When the HCU 140 allows the protection mode to be entered, the BMS 110 controls the battery relay 320' and the mode change switch unit 360' using a relay off signal. Accordingly, as illustrated in FIG. 5C, the battery relay 320' allows a connection between the battery 310 and the mode change switch unit 360'. In addition, the mode change switch unit 360' allows a connection between the battery relay 320' and one end of the door switch 340 and a connection between the other end of the door switch 340 and a control signal input end of the battery relay 320'. Accordingly, when the door switch 340 is operated, the voltage of the battery 310 may be applied to the control signal input end of the battery relay 320', and thus the protection mode may be canceled. However, since a certain time may be required until the BMS 110 controls the battery relay 320' again, it is conceivable to add a power maintaining device such as a capacitor at an appropriate position.

According to the embodiments of the present disclosure described so far, it is possible to change use of an out-vehicle switch having a unique purpose to the battery reset switch when entering the protection mode of the 12V battery. In particular, when the out-vehicle switch is applied to a door switch or trunk switch usually operated before boarding, the driver operates the battery reset switch in a process of naturally boarding the vehicle, and thus it is unnecessary to learn a separate operation method to cancel the protection mode, and there is little concern about erroneously recognizing battery discharge. In addition, since the battery reset switch is unnecessary in the vehicle interior, a degree of freedom in arranging interior switches is increased.

According to various embodiments of the present disclosure as described above, the protection mode of the low-voltage battery in the eco-friendly vehicle may be more conveniently canceled.

In particular, in the present disclosure, since the protection mode may be canceled through a device operated outside the vehicle before boarding, there is no need to learn a separate cancellation method, which is convenient.

The effects obtainable in the present disclosure are not limited to the above-mentioned effects, and other effects not mentioned herein may be clearly understood by those of ordinary skill in the art to which the present disclosure belongs from the above description.

The present disclosure described above may be implemented as computer-readable code on a medium in which a program is recorded. The computer-readable medium comprises all types of recording devices in which data readable by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, an optical data storage device, etc. It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A power management method for an electrified vehicle, the power management method comprising:
   controlling, by a power management controller, an out-vehicle switch so that the out-vehicle switch is changed from a first mode, for changing a locked state, to a second mode, for battery reset, when there is a request for entry into a protection mode for a low-voltage battery from a battery management system; and entering the protection mode when the out-vehicle switch is changed to the second mode.

2. The power management method according to claim 1, further comprising determining whether a smart key is detected, wherein the controlling is performed when the smart key is not detected.

3. The power management method according to claim 2, further comprising withholding the request for entry when the smart key is detected.

4. The power management method according to claim 1, wherein the controlling further comprises:

requesting, by the power management controller, a change to the second mode from a body control module; and controlling, by the body control module, a mode change switch unit having a first state, corresponding to the first mode, and a second state, corresponding to the second mode, so that the mode change switch unit is in the second state.

5. The power management method according to claim 4, wherein:

the mode change switch unit comprises a first switch and a second switch;

one end of the first switch is continuously connected to the out-vehicle switch, and another end of the first switch is connected to an actuator for changing the locked state in the first state and is connected to a battery relay for changing an electrical connection state between a junction box and the low-voltage battery in the second state; and one end of the second switch is continuously connected to the out-vehicle switch, and another end of the second switch is connected to the junction box in the first state and is connected to the low-voltage battery in the second state.

6. The power management method according to claim 5, further comprising:

when the request for entry into the protection mode is not output, delivering, using the battery management system, a relay on signal to the battery relay; and when the out-vehicle switch is operated while the relay on signal is delivered, applying a voltage of the low-voltage battery to the actuator, via the junction box.

7. The power management method according to claim 4, further comprising:

cancelling the protection mode when the out-vehicle switch is operated after entry into the protection mode; and changing the out-vehicle switch from the second mode to the first mode.

8. The power management method according to claim 4, wherein the mode change switch unit comprises a switch relay linked with a battery relay.

9. The power management method according to claim 1, wherein the out-vehicle switch comprises a door handle, a door lock button disposed on the door handle, a trunk button, or a tailgate button.

10. A non-transitory computer-readable recording medium recording a program for executing the method for the electrified vehicle according to claim 1.

11. An electrified vehicle comprising:
a low-voltage battery;

a battery management system configured to monitor a state of the low-voltage battery; and a power management controller configured to:
control an out-vehicle switch so that the out-vehicle switch is changed from a first mode, for changing a locked state, to a second mode, for battery reset, when there is a request for entry into a protection mode for the low-voltage battery from the battery management system; and allow the battery management system to enter the protection mode.

12. The electrified vehicle according to claim 11, further comprising a smart key controller configured to detect a smart key, wherein, when the smart key is not detected by the smart key controller, the power management controller is configured to perform a control operation to change the out-vehicle switch to the second mode.

13. The electrified vehicle according to claim 12, wherein, when the smart key is detected by the smart key controller, the power management controller is configured to withhold the request for entry.

14. The electrified vehicle according to claim 11, further comprising:

a mode change switch unit having a first state, corresponding to the first mode, and a second state, corresponding to the second mode; and a body control module configured to control the mode change switch unit so that the mode change switch unit is in the first state or the second state, wherein the power management controller is configured to request a change to the second mode from the body control module.

15. The electrified vehicle according to claim 14, wherein:
the mode change switch unit comprises a first switch and a second switch;

one end of the first switch is continuously connected to the out-vehicle switch, and another end of the first switch is connected to an actuator for changing the locked state in the first state and is connected to a battery relay for changing an electrical connection state between a junction box and the low-voltage battery in the second state; and one end of the second switch is continuously connected to the out-vehicle switch, and another end of the second switch is connected to the junction box in the first state and is connected to the low-voltage battery in the second state.

16. The electrified vehicle according to claim 15, wherein:
when the request for entry into the protection mode is not output, the battery management system is configured to deliver a relay on signal to the battery relay; and when the out-vehicle switch is operated while the relay on signal is delivered, the junction box is configured to apply a voltage of the low-voltage battery to the actuator.

17. The electrified vehicle according to claim 14, wherein, when the out-vehicle switch is operated after entry into the protection mode, the power management controller is configured to request a change to the first mode from the body control module.

18. The electrified vehicle according to claim 14, wherein the mode change switch unit comprises a switch relay linked with a battery relay.

19. The electrified vehicle according to claim 11, wherein the power management controller comprises a hybrid control unit or a vehicle control unit.

20. The electrified vehicle according to claim 11, wherein the out-vehicle switch comprises a door handle, a door lock button disposed on the door handle, a trunk button, or a tailgate button.

* * * * *